United States Patent [19]

Raisbeck

[11] Patent Number: 4,844,382

[45] Date of Patent: Jul. 4, 1989

[54] DUAL TURNING VANE AIR INLET ASSEMBLY

[75] Inventor: James D. Raisbeck, Seattle, Wash.

[73] Assignee: Raisbeck Engineering, Inc., Seattle, Wash.

[21] Appl. No.: 543,436

[22] Filed: Oct. 19, 1983

[51] Int. Cl.$^4$ .............................................. B64D 33/02
[52] U.S. Cl. ................................ 244/53 B; 60/39.092; 55/306
[58] Field of Search .................. 244/53 B, 134 R; 55/306; 60/39.092

[56] References Cited

U.S. PATENT DOCUMENTS

| 3,329,377 | 7/1967 | Peterson et al. | 244/53 B |
| 3,952,972 | 4/1976 | Tedstone et al. | 244/53 B |
| 4,250,703 | 2/1981 | Norris et al. | 244/53 B |
| 4,346,860 | 8/1982 | Tedstone | 244/53 B |

Primary Examiner—Joseph F. Peters, Jr.
Assistant Examiner—Rodney Corl
Attorney, Agent, or Firm—Christensen, O'Connor, Johnson & Kindness

[57] ABSTRACT

An air inlet assembly for a gas turbine aircraft engine includes a fixed turning vane and a movable turning vane that is carried on the trailing edge of the air deflector door. To optimally direct and accelerate a flow of air into the engine intake, the low-pressure and high-pressure surfaces of the airfoil-shaped fixed turning vane lie in parallel planes at the trailing edge of the vane. The turning vane on the air deflector door has a low-pressure, convex surface that rests against the fixed turning vane when the door is deployed in the anti-icing mode. Under normal conditions, the door is stored and the two vanes cooperate to form an aerodynamic converging channel, which accelerates the flow and attaches it to the low-pressure surface of the vane on the door.

6 Claims, 3 Drawing Sheets

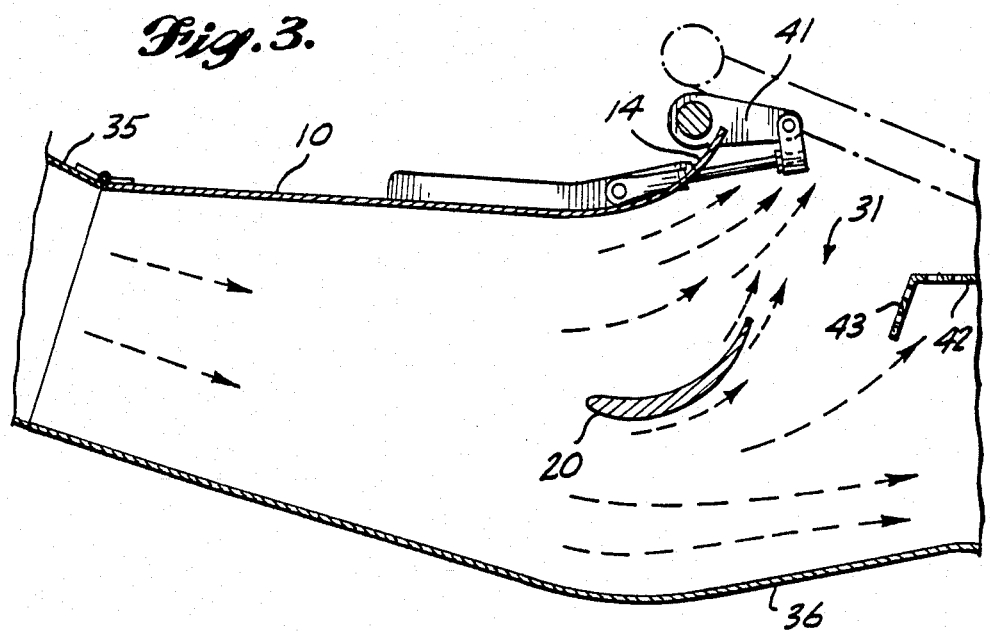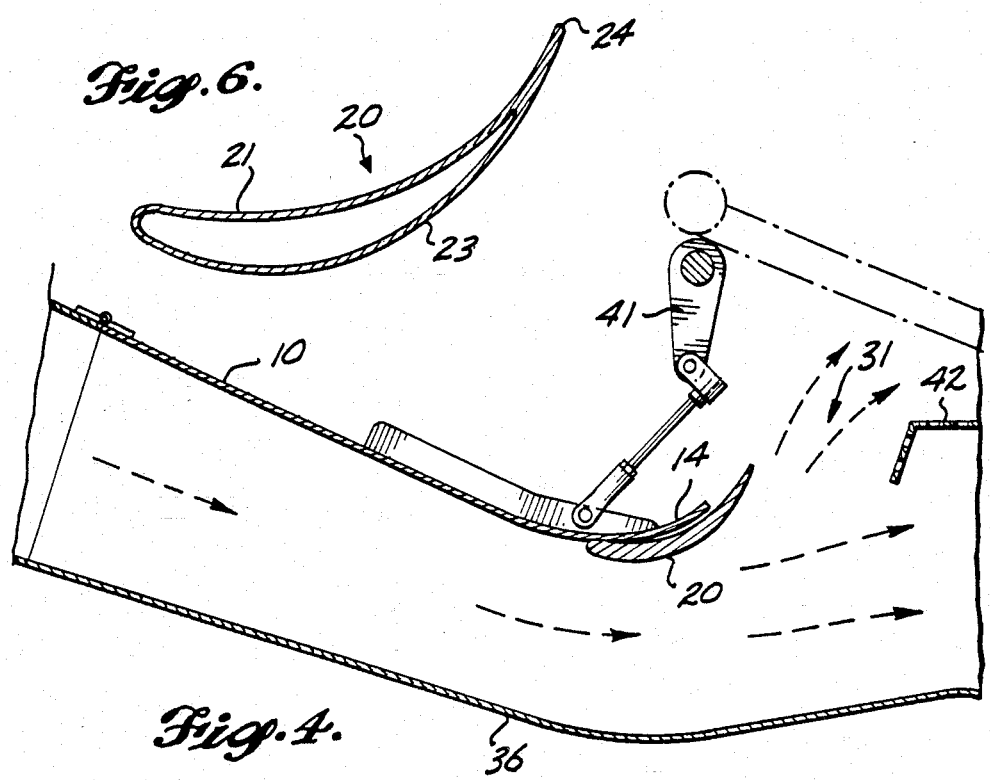

DUAL TURNING VANE AIR INLET ASSEMBLY

BACKGROUND OF THE INVENTION

This invention relates to a gas turbine aircraft engine, and more particularly, to an air inlet assembly that uses an inertial separator effect to prevent the entry of water and other debris into the air intake of such an engine.

The inertial separation effect has been widely employed to prevent ingress to an aircraft engine of water particles, ice, snow, and other debris carried by the airstream passing through the inlet air duct. The effect is typically obtained through the use of an air-deflecting door that is hinged to a wall of the air duct upstream of an opening through that wall into the plenum that surrounds the engine air inlet. In normal conditions, the hinged door is positioned against the wall so that the air duct is opened. In the presence of debris, i.e., under the so-called "icing conditions", the door is pivoted away from the wall and across a portion of the air duct to confine the incoming air to a passage of reduced cross section. As the incoming air passes through this reduced area, it is accelerated. Since the accelerated particles of debris have a higher inertia than the carrier airstream, these particles are unable to make the sharp turn needed to reach the engine inlet, i.e., around the trailing edge of the door and through the opening into the plenum. Thus, the accelerated particles pass freely through an unimpeded path to the air duct outlet further downstream. U.S. Pat. No. 3,329,377 to Peterson et al. is an example of this type of inertial separator.

When the deflector door of the above-described arrangement is extended in the anti-icing mode, there is a significant loss of pressure between the exit plane across the trailing edge of the door and the engine plenum. There is, accordingly, a significant reduction in the recovery of the pressure of the slipstream generated by the propeller, i.e., a reduction in the so-called "ram recovery." To compensate for this pressure loss, Tedstone et al. in U.S. Pat. No. 3,952,972 added a fairing to the trailing edge of the deflector door. When the door is in the extended position in the Tedstone et al. arrangement, the curved fairing smoothes the flow of the portion of the incoming airstream that is directed into the plenum. When the door is retracted, however, the positioning of the curved fairing in the plenum opening tends to disrupt the flow into the engine air intake, thus reducing ram recovery.

To overcome the disadvantages of the above-described door-plus-fairing arrangement, Tedstone, in U.S. Pat. No. 4,346,860, developed an air duct assembly in which the earlier straight trailing edge deflecting door is combined with a fixed fairing that is attached to and extends between the sidewalls of the air duct. In the icing mode, the straight trailing edge of the door fits against the leading edge of the vane, thus reducing the cross section of the air duct to achieve the inertial separation effect. The fixed fairing provides a low-pressure surface that functions like the earlier fairing to turn a portion of the incoming air toward the engine inlet. Since the fixed fairing has an airfoil shape, it continues to function as a turning vane when the deflecting door is returned to its position against the wall of the air duct. The surface of the fixed vane that turns the flow in the anti-icing mode has a convex central portion that merges with flat surfaces that extend to the leading and trailing edges. While this arrangement does provide improved recovery of pressure in the nonicing mode, losses remain, owing in part to the configuration of the vane and in part to the presence at the plenum inlet of the abrupt straight edge of the retracted deflector door.

The present invention provides an improved arrangement that overcomes the disadvantages of the developments described above. In particular, an important aspect of the invention is the provision of an optimized fixed turning vane that functions both in the anti-icing and normal modes to direct air toward the engine inlet. A further aspect of the invention is the provision of a turning vane on the trailing edge of the air deflector door which, in the normal mode, cooperates with the fixed turning vane to form an aerodynamic converging channel for accelerating the flow in a smooth, attached manner into the engine air intake area.

SUMMARY OF THE INVENTION

In accordance with the invention, there is provided an air inlet assembly for a gas turbine aircraft engine having a longitudinal axis and an air intake open in a lateral direction. An air duct extends from an inlet generally parallel to the longitudinal axis of the engine. The wall of the duct adjacent the engine has an opening that communicates with the air inlet of the engine. A fixed turning vane extends across the air duct between a pair of opposed sidewalls and spaced outwardly from the wall adjacent the engine and outwardly from a second wall that lies in opposition thereto. An air-deflecting door is pivotally connected at its leading edge to the wall adjacent the engine. The door is movable between a stored position away from the fixed turning vane and toward the engine and a deployed position in which the door extends across a portion of the cross section of the air duct and into engagement with the fixed turning vane to provide a reduced cross section for the passage of incoming air. In this position, the fixed turning vane turns a portion of the incoming air through the opening and into the engine air intake. In the stored position, a turning vane provided on the trailing edge of the door cooperates with the fixed turning vane to direct incoming air through the throat and into the air intake of the engine.

In a preferred form, the fixed turning vane has an airfoil shape with a high-pressure, concave surface disposed opposite a low-pressure, convex surface provided on the turning vane of the air-deflecting door. In the stored position, or normal mode, these surfaces aerodynamically cooperate in a flow-converging manner to cause the flow to remain smoothly attached to and accelerate over the exposed low-pressure surface of the turning vane on the air-deflecting door.

In accordance with an additional aspect of the invention, it is preferred that the fixed turning vane have a continuously, convex surface extending between the leading and trailing edges and that this surface lie at its trailing edge in a plane that is parallel to the plane of the trailing edge of the high-pressure, concave surface. With the trailing edge directed toward the air intake of the engine, this arrangement optimally directs and accelerates a flow of air into the engine air intake.

BRIEF DESCRIPTION OF THE DRAWINGS

The invention can best be understood by the following portion of the specification taken in conjunction with the accompanying drawings in which:

FIG. 3 is a simplified cross-sectional side elevation view of the assembly of FIG. 1;

FIG. 4 is a simplified cross-sectional side elevation of the assembly of FIG. 2;

FIG. 6 is a cross-sectional view showing the detail of the fixed turning vane.

DETAILED DESCRIPTION OF THE INVENTION

Figure 1:
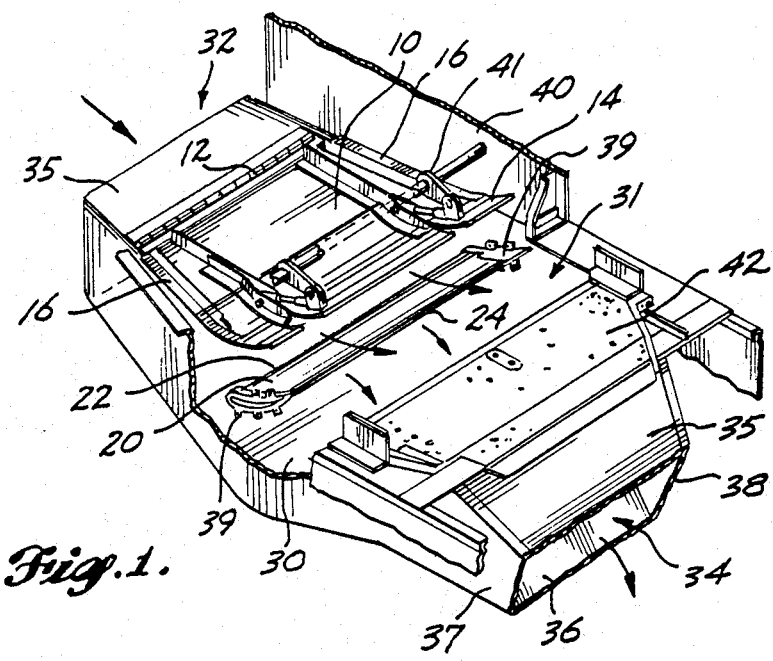
FIG. 1 is a perspective view with parts broken of an air inlet assembly showing the deflecting door in the stored or stowed position.
Figure 2:
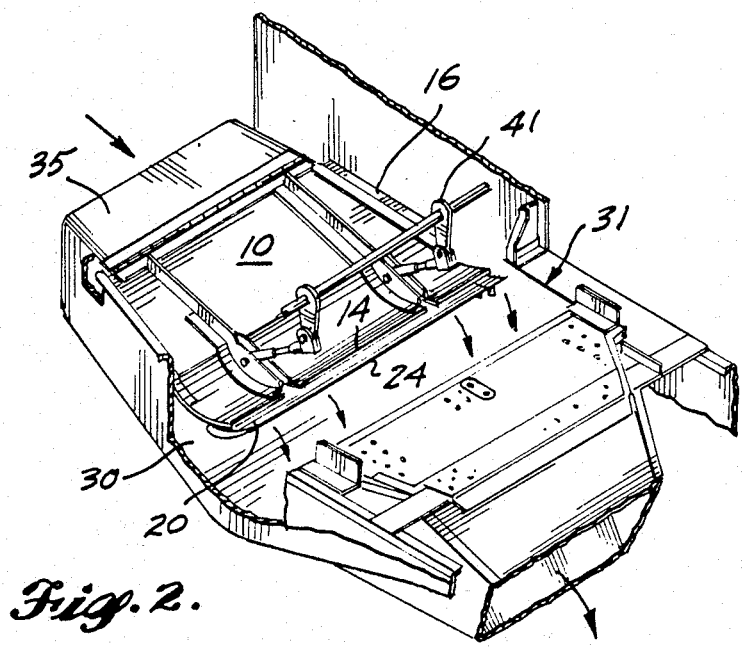
FIG. 2 is a view similar to FIG. 1 showing the air-deflecting door in the deployed position.

In FIGS. 1 and 2, an air inlet assembly according to the invention is shown installed within a nacelle 40 of an aircraft. It is to be understood that the installations of FIGS. 1 and 2 lie adjacent an aircraft engine as, for example, illustrated in FIG. 5. In such an arrangement, an air duct 30 having an upstream inlet area 32 and a downstream outlet area 34 conducts a flow of air for use by the engine. The air duct 30 is defined by a first wall 35, a second wall 36, and a pair of opposed sidewalls 37 and 38. As shown, the sidewalls 37 and 38 extend between the second wall 36 and the first wall 35, which is positioned adjacent the engine. The downstream portion of the first wall 35 includes an ice shedder screen 42 that will be further described hereinafter. An air-deflecting door, or particle separator door, 10 is pivotally attahced at its upstream leading edge to the first wall 35 by means of a hinge 12.

In FIG. 1 it is to be noted that, with the door 10 removed, there is an opening defined between the portion of the first wall 35 adjacent the inlet area 32 and the upstream edge of the ice shedder screen 42 (which, in terms of the air duct 30 is an extension of the first wall 35). Wheninstalled, as in FIGS. 1 and 2, the door 10 functions, in terms of the airflow through the duct, as a movable extension of the first wall 35. As seen more clearly in FIGS. 3 and 4, the movement of the door 10 between stored and deployed positions varies the size of the opening available for a flow of air into the engine plenum and air intake. Referring again to FIG. 1, although not shown, the portion of the deflector door 10 upstream of the turning vane 14 has side edges that curve downward toward the second wall 36 and adjacent the sidewalls 37 and 38. To seal the side edges of the door, brush seals 16 are attached to the upper surface of the door above the downwardly bent side edges thereof and outward over the upstream portion of the turning vane 14.

It is to be understood that rather than the arrangement shown, the wall 35 could extend downstream into the area occupied by the door 10. In such an arrangement, the door 10 would be hinged to the wall 35 upstream of the opening therein. In this arrangement, the door 10 would be disposed against the first wall 35 in the stored position.

The air deflector door can be moved between the stored position (the normal or nonicing mode) of FIG. 1 into the deployed position (or anti-icing mode) illustrated in FIG. 2, where the turning vane 14 provided on the trailing edge of the door engages a fixed turning vane 20. The deflector door is moved between the stored and deployed positions by means of a conventional actuating mechanism 41, the details and operation of which will be readily understood by those skilled in the art.

The fixed turning vane 20 extends across the full width of the air duct between the sidewalls 37 and 38, to which the vane is securely attached by brackets 39. The leading edge 22 of the vane is directed upstream toward the inlet area of the duct, while the trailing edge 24 is directed through the throat 31 and toward the air inlet of the engine. This positioning is shown more clearly in FIG. 5 in which the leading edge of the fixed turning vane is generally aligned with the direction of the air flowing through the inlet.

In the installation shown in FIGS. 1 and 2, the turning vane 14 has had portions cut away in order to accommodate the existing actuating mechanism 41. As will become apparent from the discussion below, maximum performance of the turning vane 14 is obtained when it has a continuous, unbroken shape.

Simplified cross-sectional, side elevation views of the installation of FIGS. 1 and 2 are shown in FIGS. 3 and 4, respectively. In the normal mode shown in FIG. 3, the air-deflecting door 10 is in the stored or retracted position, thus defining a fully open throat 31 in the area between the door and the upstream edge of the ice shedder screen assembly 42. In this mode, the bypass portion of the air duct, i.e., that portion of the duct downstream of the ice shedder screen 42 is sealed against flow by a conventional bypass door (not shown). In accordance with conventional practice, this bypass door is operatively linked to the actuating mechanism 41 for the air-deflecting door such that the bypass door seals the outlet of the air duct in the normal mode and opens the outlet in the anti-icing mode in order to permit expulsion of water, ice, and other debris. With this synchronizing action between the deflecting door 10 and bypass door, it will be seen that, in the normal mode, a pressurized flow of air is directed upward through the throat 31 and through the screen 42 into the plenum around the engine, and thus into the air intake. In the anti-icing mode illustrated in FIG. 4, the air-deflecting door is in its deployed position against the fixed turning vane 20. There is flow-sealing engagement of the door 10 with the fixed turning vane so that incoming air can only pass around the turning vane. Since the bypass door is open in this icing mode, particles of debris are accelerated through the reduced cross section of the air duct between the fixed turning vane 20 and the second wall 36 and passed downstream and out of the duct through the outlet. Those particles of water and other debris that are not sufficiently accelerated make a partial turn around the vane 20, striking and freezing upon the ice shedder screen 42. Incoming air that does not contain particles is diverted upward into the engine intake through the throat 31, which, it will be seen, has a reduced area.

In the normal mode of FIG. 3, the cooperative action of the fixed turning vane 20 and the turning vane 14 optimizes the ram recovery. By way of example, an improvement in ram recovery from 62 percent to about 92 percent was achieved by installing an inlet assembly in accordance with the invention in place of an existing assembly in a Beechcraft King Air 200 aircraft having a Pratt & Whitney PT6A engine. The replaced assembly had a straight trailing edge deflector door and had no fixed turning vane. The construction of the installed door 10, fixed turning vane 20, and ice shedder screen 42 was essentially that shown in FIGS. 1 and 2. In addition to the illustrated structure, the plenum about the air intake was further sealed.

Figure 5:
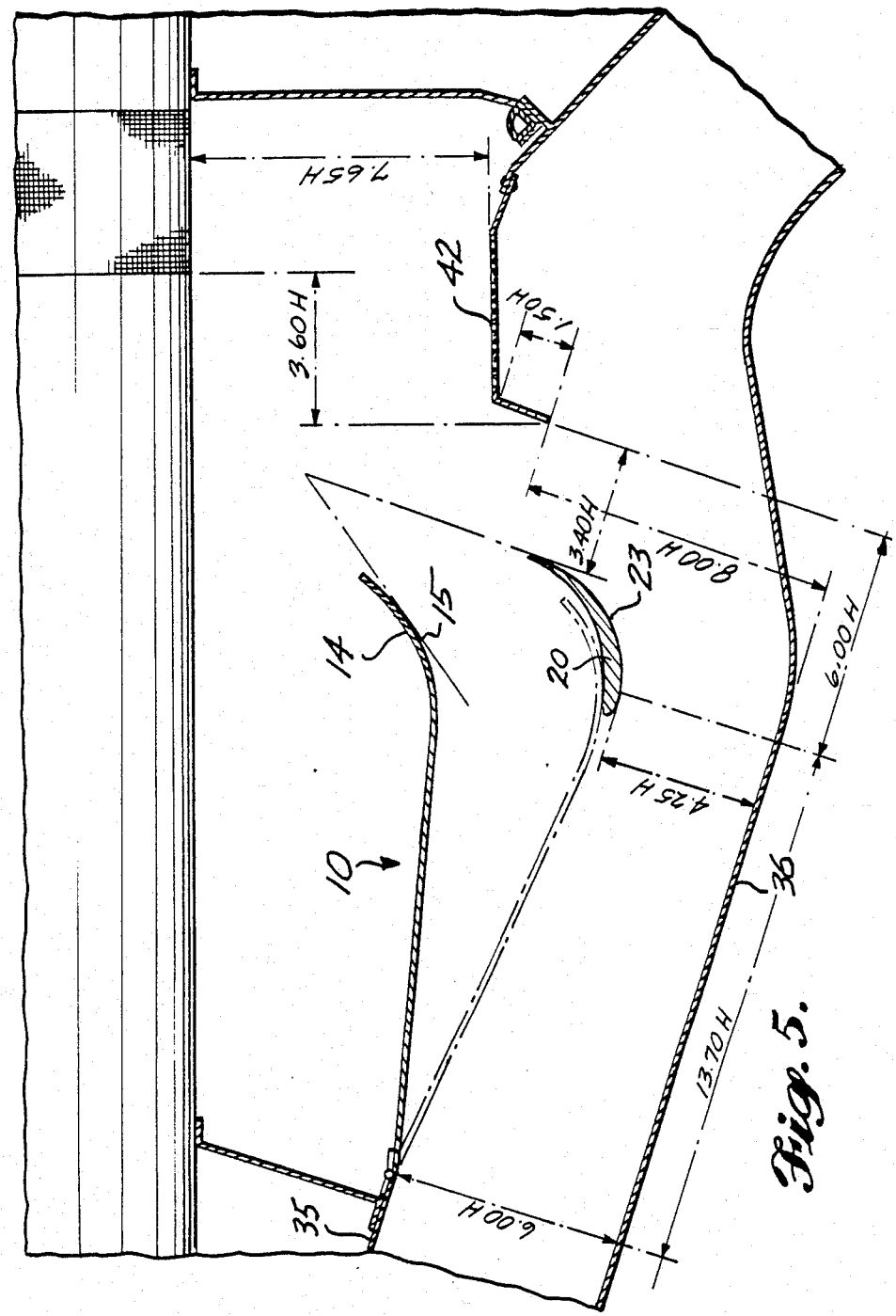
FIG. 5 is a simplified cross-sectional side elevation of an air inlet assembly taken along a longitudinal plane through a typical engine nacelle.

The coactive dual turning vane effect is best understood by reference to FIGS. 5 and 6. Referring first to FIG. 6, a cross section through the fixed turning vane 20 is shown. Since only the external surfaces of the vane influence the airflow, it will be understood that the internal configuration may be other than the hollow arrangement shown in FIG. 6, which hollow configuration is preferred to avoid the addition of unnecessary weight. The structure shown in FIG. 6 is that of an extruded part. It will be appreciated that the vane 20 may be formed by other means, such as shaping a single piece of sheet metal and joining the ends thereof at the trailing edge 24 of the vane.

The turning vane 20 has a high-pressure concave surface 21 that curves from the blunt leading edge 22 through progressively decreasing radii to a substantially planar surface at the trailing edge 24. The airfoil shape of the vane is completed by a low-pressure, convex surface 23 that curves through several different radii to a substantially planar surface at the trailing edge 24. At the trailing edge, the planes of the high-pressure and low-pressure surfaces are parallel. Thus, at the trailing edge of the fixed turning vane, the velocity, or momentum, vectors of the airflow are substantially parallel. Preferably, the turning vane 20 is positioned with the leading edge 22 in relation to the direction of flow through the duct so that the parallel velocity vectors at the trailing edge 24 are substantially perpendicular to the local flow through the duct. It will be noted that in the normal mode the low-pressure surface 23 smoothly turns a flow of air, less particles, upward into the engine air inlet.

As noted above, the straight trailing edge on the deflecting doors of prior fixed turning vane arrangements results in pressure losses between the air duct and plenum in the normal mode. These losses are attributable to the presence, at the opening into the plenum, of the abrupt edge of the deflector door. To overcome this disadvantage and, thus, increase the ram recovery, the fixed turning vane 20 and the turning vane 14 on the deflecting door 10 are cooperatively arranged to accelerate and divert a smooth flow of air into the engine plenum and air intake in the normal mode, i.e., when the door is in its stored position. This can best be understood with reference to FIG. 5. The illustrated arrangement corresponds with the installations illustrated in FIGS. 1 through 4. For clarity, however, parts have been eliminated. A portion of an engine 45 and its associated air intake screen 46 (which overlies the engine air intake not shown), is shown above the inlet assembly of the invention. It will be understood that the engine is enclosed within a plenum, which is typically formed between the forward and aft bulkheads within the nacelle.

A convex, low-pressure surface 15 of the deflector door turning vane 14 is exposed to the flow of air in the stored position. To keep the flow attached to, and accelerating over, the low-pressure surface 15, a pressure distribution is established between surface 15 and the high-pressure concave surface 21 of the fixed turning vane. In particular, there is formed a converging channel that aerodynamically causes the flow to accelerate and remain attached to the low-pressure surface 15 of the turning vane. To achieve this convergence, the angle of the trailing edge surfaces of the fixed turning vane 20 (either surface since they are substantially parallel) forms an acute angle with a line drawn tangent to the point on the surface 15 through which passes the plane of minimum cross-sectional area between the two vanes. Referring to FIG. 5, this point is located by striking surface 15 with the smallest arc that can be drawn, using the trailing edge of the fixed turning vane 20 as the center. For convergence, the angle formed must be greater than zero degrees. For optimum performance, it is preferred that the angle be greater than or equal to nine degrees and less than or equal to 15 degrees.

The present invention has been described in relation to its preferred embodiment. One of ordinary skill, after reading the foregoing specification, will be able to effect various changes and substitutions of equivalents without departing from the broad concepts disclosed herein. It is therefore intended that the protection afforded by Letters Patent granted hereon be limited only by the definition contained in the appended claims and equivalents thereof.

The embodiments of the invention in which an exclusive property or privilege is claimed are defined as follows:

1. A fixed turning vane for directing air through an opening in an inlet air duct to the air intake of the gas turbine aircraft engine, said vane having an airfoil shape with a high-pressure concave surface and a low-pressure convex surface, each of said surfaces extending between a leading edge and a trailing edge of said vane, said surfaces being disposed in substantially parallel planes at the trailing edge of said vane, said vane being disposed within said duct in spaced-apart relation to said opening and with the trailing edge thereof positioned so that said parallel planes lie substantially perpendicular to the direction of flow of air through said air duct.

2. An air inlet assembly for a gas turbine aircraft engine, said engine having a longitudinal axis and an air intake open in a lateral direction, said assembly comprising:
   an air duct extending generally parallel to the longitudinal axis of said engine, said duct having an inlet and an outlet, a first wall adjacent said engine, a second wall opposite said first wall, and a pair of opposed sidewalls, said first wall having an opening communicating with the air intake of said engine;
   a fixed turning vane extending across said air duct between the sidewalls thereof and spaced outward from said first and second walls, said fixed turning vane diverting incoming air through the opening and into the air intake of said engine;
   an air-deflecting door pivotally connected at a leading edge thereof to the first wall of said air duct at an upstream edge of said opening, said door having a turning vane at the trailing edge thereof, said door being movable between a stored position and a deployed position, in the deployed position said door extending across a portion of the cross section of the air duct and into engagement with said fixed turning vane, thereby providing a reduced cross section for the passage of incoming air, in the stored position said door being positioned apart from said fixed turning vane and toward said engine, the turning vane of said door being constructed and arranged so as to cooperate in the stored position with the fixed turning vane to direct incoming air through the opening and into the air intake of said engine;

said fixed turning vane having an airfoil shape having a high-pressure concave surface disposed opposite said air-deflecting door, the turning vane of said air-deflecting door having a low-pressure convex surface disposed opposite the high-pressure concave surface of said fixed turning vane, said surfaces cooperating to form an aerodynamic converging channel when said door is in the stored position.

3. The air inlet assembly of claim 2, wherein the high-pressure concave surface of said fixed turning vane extends between the leading and trailing edges thereof, and wherein said vane further includes a low-pressure convex surface extending between the leading and trailing edges thereof, said surfaces being disposed in substantially parallel planes at the trailing edge of said vane.

4. The air inlet assembly of claim 3, wherein said planes are substantially perpendicular to the direction of the flow of air through said air duct.

5. The air inlet assembly of claim 3, wherein the convex surface of the turning vane of the deflecting door engages the concave surface of the fixed turning vane when said door is in the deployed position.

6. An air inlet assembly for a gas turbine aircraft engine, said engine having a longitudinal axis and an air intake open in a lateral direction, said assembly comprising:

an air duct extending generally parallel to the longitudinal axis of said engine, said duct having an inlet and an outlet, a first wall adjacent said engine, a second wall opposite said first wall, and a pair of opposed sidewalls, said first wall having an open throat communicating with the air intake of said engine;

a fixed turning vane extending across said air duct between the sidewalls thereof and spaced outward from said first and second walls, said fixed turning vane diverting incoming air through the throat and into the air intake of said engine;

an air-deflecting door pivotally connected at a leading edge thereof to the first wall of said air duct upstream of the throat, said door having a turning vane at the trailing edge thereof, said door being movable between a stored position and a deployed position, in the stored position said door being positioned against the first wall of said duct, the turning vane of said door being constructed and arranged so as to cooperate in the stored position with the fixed turning vane to direct incoming air through the throat and into the air intake of said engine, in the deployed position said door extending across a portion of the cross section of the air duct and into engagement with said fixed turning vane, thereby providing a reduced cross section for the passage of incoming air;

said fixed turning vane having an airfoil shape having a high-pressure concave surface disposed opposite said air-deflecting door, the turning vane of said air-deflecting door having a low-pressure convex surface disposed opposite the high-pressure concave surface of said fixed turning vane, said surfaces cooperating to form an aerodynamic converging channel when said door is in the stored position.

* * * * *

UNITED STATES PATENT AND TRADEMARK OFFICE
CERTIFICATE OF CORRECTION

PATENT NO. : 4,844,382
DATED : July 4, 1989
INVENTOR(S) : James D. Raisbeck

It is certified that error appears in the above-identified patent and that said Letters Patent is hereby corrected as shown below:

| | | |
|---|---|---|
| Column 2 | Line 56 | "continuously," should be --continuously curved,-- |
| Column 3 | Line 33 | "attahced" should be --attached-- |
| Column 3 | Line 40 | "Wheninstalled" should be --When installed-- |
| Column 8 | Line 15 | after "said" insert --air-- |

Signed and Sealed this

Twenty-ninth Day of May, 1990

Attest:

HARRY F. MANBECK, JR.

Attesting Officer

Commissioner of Patents and Trademarks